(12) United States Patent
Lee et al.

(10) Patent No.: US 8,595,015 B2
(45) Date of Patent: Nov. 26, 2013

(54) AUDIO COMMUNICATION ASSESSMENT

(75) Inventors: Woo Beum Lee, Basking Ridge, NJ (US); Arvind Basra, Glen Ridge, NJ (US)

(73) Assignees: Verizon New Jersey Inc., Newark, NJ (US); Cellco Partnership, Basking Ridge, NJ (US)

( * ) Notice: Subject to any disclaimer, the term of this patent is extended or adjusted under 35 U.S.C. 154(b) by 128 days.

(21) Appl. No.: 13/204,946

(22) Filed: Aug. 8, 2011

(65) Prior Publication Data

US 2013/0041661 A1    Feb. 14, 2013

(51) Int. Cl.
| | |
|---|---|
| G10L 15/00 | (2013.01) |
| G10L 15/20 | (2006.01) |
| G10L 15/26 | (2006.01) |
| G10L 15/04 | (2013.01) |
| G10L 21/00 | (2013.01) |
| G10L 25/00 | (2013.01) |
| G09B 19/00 | (2006.01) |
| H04M 1/64 | (2006.01) |

(52) U.S. Cl.
USPC ........... 704/270; 704/233; 704/235; 704/246; 704/251; 704/275; 434/156; 379/88

(58) Field of Classification Search
USPC ................. 704/235, 246, 233, 270, 275, 251; 434/156; 379/88.01
See application file for complete search history.

(56) References Cited

U.S. PATENT DOCUMENTS

| | | | | |
|---|---|---|---|---|
| 6,336,091 | B1 * | 1/2002 | Polikaitis et al. | 704/233 |
| 7,206,743 | B2 * | 4/2007 | Bonnifait et al. | 704/270 |
| 2008/0109224 | A1 * | 5/2008 | Dvorak et al. | 704/251 |
| 2009/0104956 | A1 * | 4/2009 | Kay et al. | 463/7 |
| 2011/0054894 | A1 * | 3/2011 | Phillips et al. | 704/235 |
| 2011/0054897 | A1 * | 3/2011 | Phillips et al. | 704/235 |
| 2011/0093267 | A1 * | 4/2011 | Witzman | 704/246 |
| 2011/0182481 | A1 * | 7/2011 | Dernis et al. | 382/116 |
| 2011/0251841 | A1 * | 10/2011 | Cook et al. | 704/207 |
| 2011/0257974 | A1 * | 10/2011 | Kristjansson et al. | 704/246 |
| 2011/0307253 | A1 * | 12/2011 | Lloyd et al. | 704/233 |
| 2012/0116772 | A1 * | 5/2012 | Jones et al. | 704/270 |
| 2012/0265703 | A1 * | 10/2012 | Basra et al. | 705/319 |
| 2013/0158977 | A1 * | 6/2013 | Senior | 704/9 |

OTHER PUBLICATIONS

U.S. Appl. No. 61/456,671, filed Nov. 2010, Jones et al.*

* cited by examiner

*Primary Examiner* — Paras D Shah
*Assistant Examiner* — Anne Thomas-Homescu (57) ABSTRACT

A device may include a communication interface configured to receive audio signals associated with audible communications from a user; an output device; and logic. The logic may be configured to determine one or more audio qualities associated with the audio signals, map the one or more audio qualities to at least one value, generate audio-related information based on the mapping, and provide, via the output device during the audible communications, the audio-related information to the user.

22 Claims, 8 Drawing Sheets

AUDIO COMMUNICATION ASSESSMENT

BACKGROUND INFORMATION

Generally, an ideal speaking rate is somewhere between 180-200 words per minute (wpm) for optimal comprehension by a native-language listener. However, even among individuals sharing a common language, the ideal speech rate varies according to different dialects that may be identified for various demographic groups and/or geographic regions. In addition, ideal speaking volume, for optimal listener comprehension, can vary with the age of the listener and competing ambient noise levels. Thus, audio qualities such as speech rate and volume level affect the listener experience.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to assessing volume, tempo, inflection and other audible characteristics of speech. For example, speech recognition may be used to calculate an average number of words being spoken per unit of time. The assessment information may be provided substantially instantaneous to present feedback to the speaker. In some implementations, the assessment information may be evaluated against audience-specific information. As used herein, "audio" and its variants may refer to sound and/or linguistics properties. As used herein, "audience" may generally refer to one or more listeners of audible communications, i.e., individuals to whom the communications are directed. As used herein, "audible communications" may generally refer to speech, including voice data or a series of utterances, and/or other generated sound, for example, associated with a presentation and/or dialog.

Figure 1:
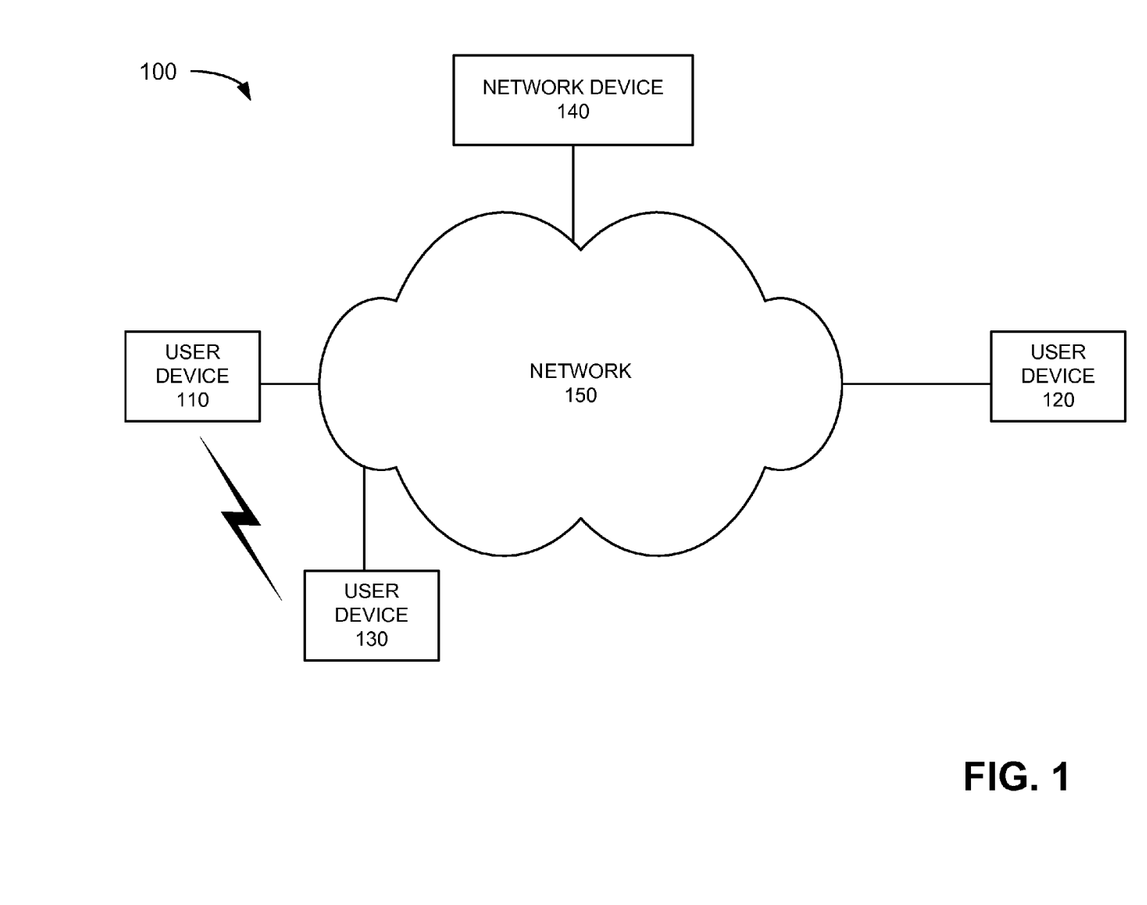
FIG. 1 illustrates an exemplary environment in which systems and methods described herein may be implemented.

FIG. 1 is a block diagram of an exemplary environment 100 in which systems and methods described herein may be implemented. Environment 100 may include user devices 110, 120, and 130, network device 140, and network 150.

Each of user devices 110, 120, and 130 may include any device or combination of devices capable of transmitting voice signals and/or data to a network, such as network 150. In one implementation, user devices 110-130 may include any type of communication device, such as a plain old telephone system (POTS) telephone, a voice over Internet protocol (VoIP) telephone (e.g., a session initiation protocol (SIP) telephone), a wireless or cellular telephone device (e.g., a personal communications system (PCS) terminal that may combine a cellular radiotelephone with data processing and data communications capabilities, a personal digital assistant (PDA) that can include a radiotelephone, or the like), etc. In another implementation, user devices 110-130 may include any type of computer device or system, such as a personal computer (PC), a laptop, a PDA, a wireless or cellular telephone, a wireless accessory, etc., that can communicate via telephone calls and/or text-based messaging (e.g., text messages, instant messaging, email, etc.). User devices 110-130 may connect to network 150 via any conventional technique, such as wired, wireless, or optical connections.

Network device 140 may include one or more computing devices, such as one or more servers, computers, etc., used to receive information from other devices in environment 100. For example, network device 140 may receive an audio signal generated by any of user devices 110-130, as described in detail below.

Network 150 may include one or more wired and/or wireless networks that are capable of receiving and transmitting data, voice and/or video signals, including multimedia signals that include voice, data and video information. For example, network 150 may include one or more public switched telephone networks (PSTNs) or other type of switched network. Network 150 may also include one or more wireless networks and may include a number of transmission towers for receiving wireless signals and forwarding the wireless signals toward the intended destinations. Network 150 may further include one or more packet switched networks, such as an Internet protocol (IP) based network, a local area network (LAN), a wide area network (WAN), a personal area network (PAN), an intranet, the Internet, or another type of network that is capable of transmitting data.

The exemplary configuration illustrated in FIG. 1 is provided for simplicity. It should be understood that a typical environment may include more or fewer devices than illustrated in FIG. 1. For example, environment 100 may include additional elements, such as switches, gateways, routers, etc., that aid in routing traffic, such as voice data, from user devices 110-130 to their respective destinations in environment 100. In addition, although user devices 110-130 and network device 140 are shown as separate devices in FIG. 1, in other implementations, the functions performed by two or more of user devices 110-130 and network device 140 may be performed by a single device or platform. For example, in some implementations, the functions described as being performed by one of user devices 110-130 and network device 140 may be performed by one of user devices 110-130. In addition, functions described as being performed by a device may be performed by a different device.

Figure 2:
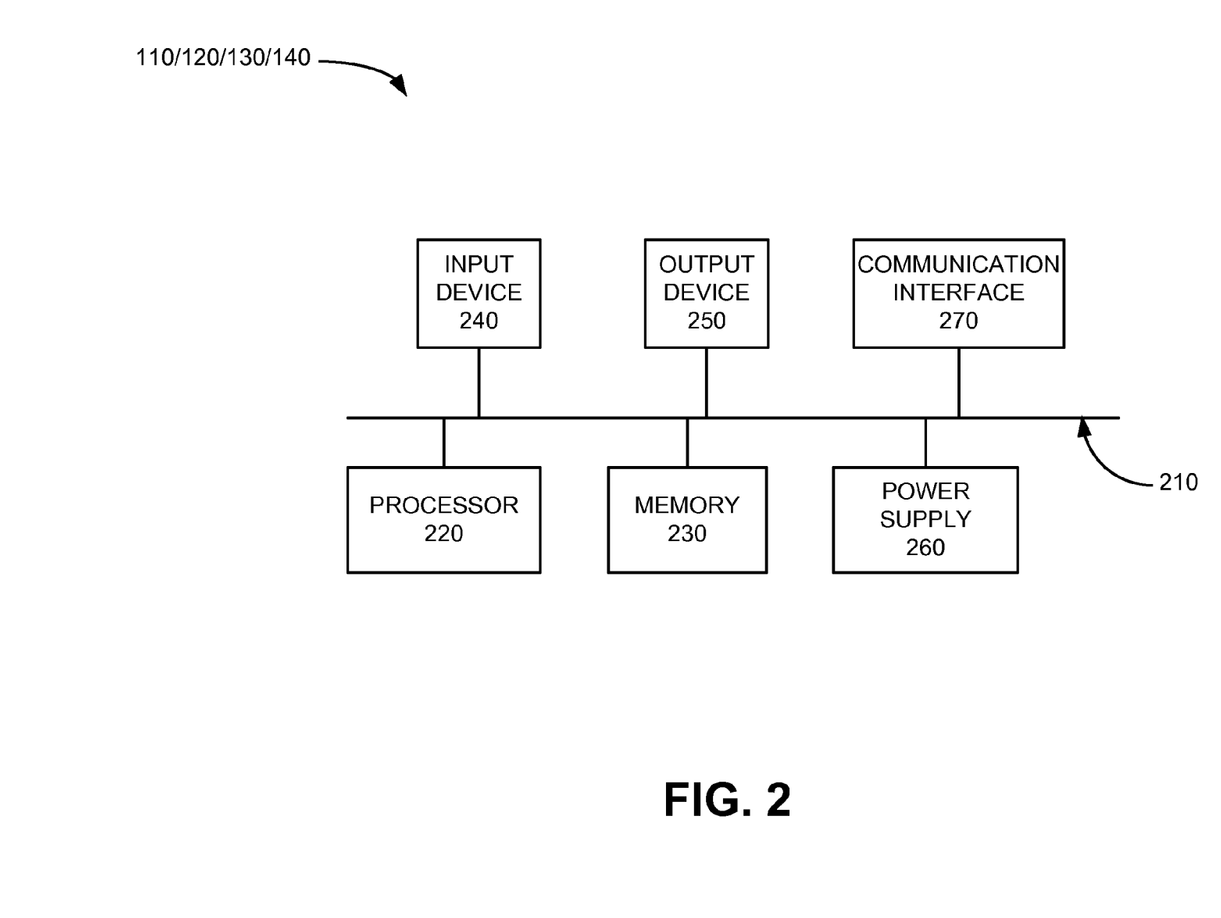
FIG. 2 illustrates an exemplary configuration of a user device or network device of FIG. 1.

FIG. 2 illustrates an exemplary configuration of user device 110. User devices 120 and 130 and network device 140 may be configured in a similar manner. In one embodiment, user devices 120 and 130 may connect to each other, for example, via a wireless protocol, such as Bluetooth® protocol. Referring to FIG. 1, user device 110 may include a bus 210, a processor 220, a memory 230, an input device 240, an output device 250, a power supply 260 and a communication interface 270. Bus 210 may include a path that permits communication among the elements of user device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a magnetic and/or optical recording medium and its corresponding drive.

Input device 240 may include a mechanism that permits a user to input information to user device 110, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc. Power supply 260 may include a battery or other power source used to power user device 110.

Communication interface 270 may include a transceiver that user device 110 may use to communicate with other devices (e.g., user devices 120/130 or network device 140) and/or systems. For example, communication interface 270 may include mechanisms for communicating via network 150, which may include a wireless network. In these implementations, communication interface 270 may include one or more radio frequency (RF) transmitters, receivers and/or transceivers and one or more antennas for transmitting and receiving RF data via network 150. Communication interface 270 may also include a modem or an Ethernet interface to a LAN. Alternatively, communication interface 270 may include other mechanisms for communicating via a network, such as network 150.

User device 110 may perform processing associated with conducting communication sessions. For example, user device 110 may perform processing associated with making and receiving telephone calls, recording and transmitting audio and/or video data, sending and receiving electronic mail (email) messages, text messages, instant messages (IMs), mobile IMs (MIMs), short messaging service (SMS) messages, etc. User device 110, as described in detail below, may also perform processing associated with assessing audible information received via audio signals and providing the assessment information to a user and/or to other applications executed by user device 110.

User device 110 may perform these and other operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), solid state drive (SSD) etc.), or from another device via communication interface 270. Alternatively, hard-wired circuitry may be used in place of or in combination with software instructions to implement processes consistent with the implementations described herein. Thus, implementations described herein are not limited to any specific combination of hardware circuitry and software.

Figure 3:
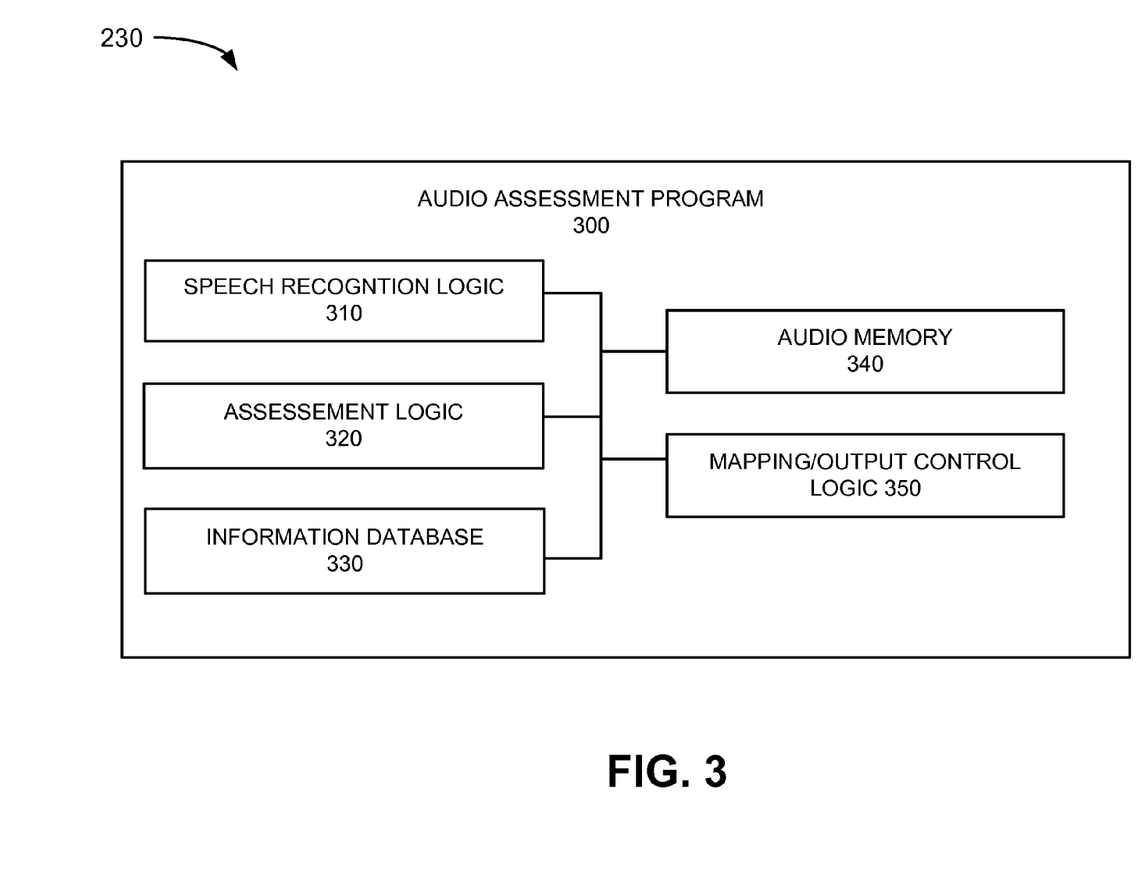
FIG. 3 illustrates an exemplary configuration of functional components implemented in the device of FIG. 2.

FIG. 3 is an exemplary functional block diagram of components implemented in user device 110 of FIG. 2, such as by processor 220 executing a program stored in memory 230. Referring to FIG. 3, an audio assessment program 300 may be stored in memory 230. Audio assessment program 300 may include a software program that analyzes portions of audio signals, such as portions of phone calls and/or various live communication sessions, involving the user of device 110. In an exemplary implementation, audio assessment program 300 may include speech recognition logic 310, assessment logic 320, information database 330, audio memory 340, and mapping/output control logic 350.

Audio assessment program 300 and its various logic components are shown in FIG. 3 as being included in user device 110. In alternative implementations, these components or a portion of these components may be located externally with respect to user device 110. For example, in some implementations, one or more of the components of audio assessment program 300 may be located in or executed by network device 140.

Speech recognition logic 310 may include logic to perform speech recognition on voice data produced from a series of utterances by one or more parties. For example, speech recognition logic 310 may convert an audio signal received from a user(s) of user device 110, into text corresponding to spoken words associated with the audio signal. Assessment logic 320 may then analyze the text, as described below. In other implementations, speech recognition logic 310 may generate a speaker's talking rate (e.g., in words per minute).

Assessment logic 320 may interact with other components of audio assessment program 300 to analyze an audio signal to determine one or more audio qualities associated with audible information identified in the audio signal. For example, assessment logic 320 may interact with information database 330 to identify one or more audience-based characteristics to which the assessed audio qualities are mapped. As one example, information database 330 may store audience-specific information indicative of, for example, an audience demographic.

For example, a geographic location of the audience may correspond to information input by the user of user device 110. Further, when the user is using user device 110 to communicate remotely to one or more parties over a network, the remote parties' location may be determined based on an identifier(s) (e.g., telephone number) used to place the call or via which the call is received, as determined by caller ID, for example. As another example, when the user is using user device 110 in the immediate presence of the audience, the location of user device 110 may be obtained using GPS (global position system) and/or triangulation information. In whatever manner the audience location is determined, assessment logic 320 may correlate the location information to demographic information, for the audience, stored in information database 330.

Assessment logic 320 may perform audio signal processing based on the audience-based characteristics. For example, when the audience-based characteristics include geographic information, assessment logic 320 may select to determine a tempo, a volume, and/or prosody, or other statistical or quantifiable information identified in the audio signals, and use one or more of the identified properties as representative audio qualities associated with the voice data and/or segments of the voice data. In these cases, mapping/output control logic 350 may map the respective assessed audio qualities to audio characteristics corresponding to the particular audience demographic associated with the audience's location. The results of the mapping may be buffered or stored in audio memory 340. For example, audio memory 340 may store mapping information associated with a number of different audiences, party identifiers, etc. In another example, audio memory 340 may store recordings of communications, for example, in audio files.

Mapping/output control logic 350 may include logic that generates audio-related information, based on the results of the mapping operations, including data representations that may be provided to a user of user device 110 via output device 250, and presented as visual, audio, and/or tactile information, for example, via user device 110 and/or user device 130, which may be a Bluetooth®-enabled device or other peripheral device connected to user device 110. Mapping/output control logic 350 may also allow the user to select various aspects for outputting the information via output device 250 and/or provide follow-up interaction with the user for other applications stored on user device 110 based on the audio-related information and/or input information provided by the user, as described below.

Figure 4:
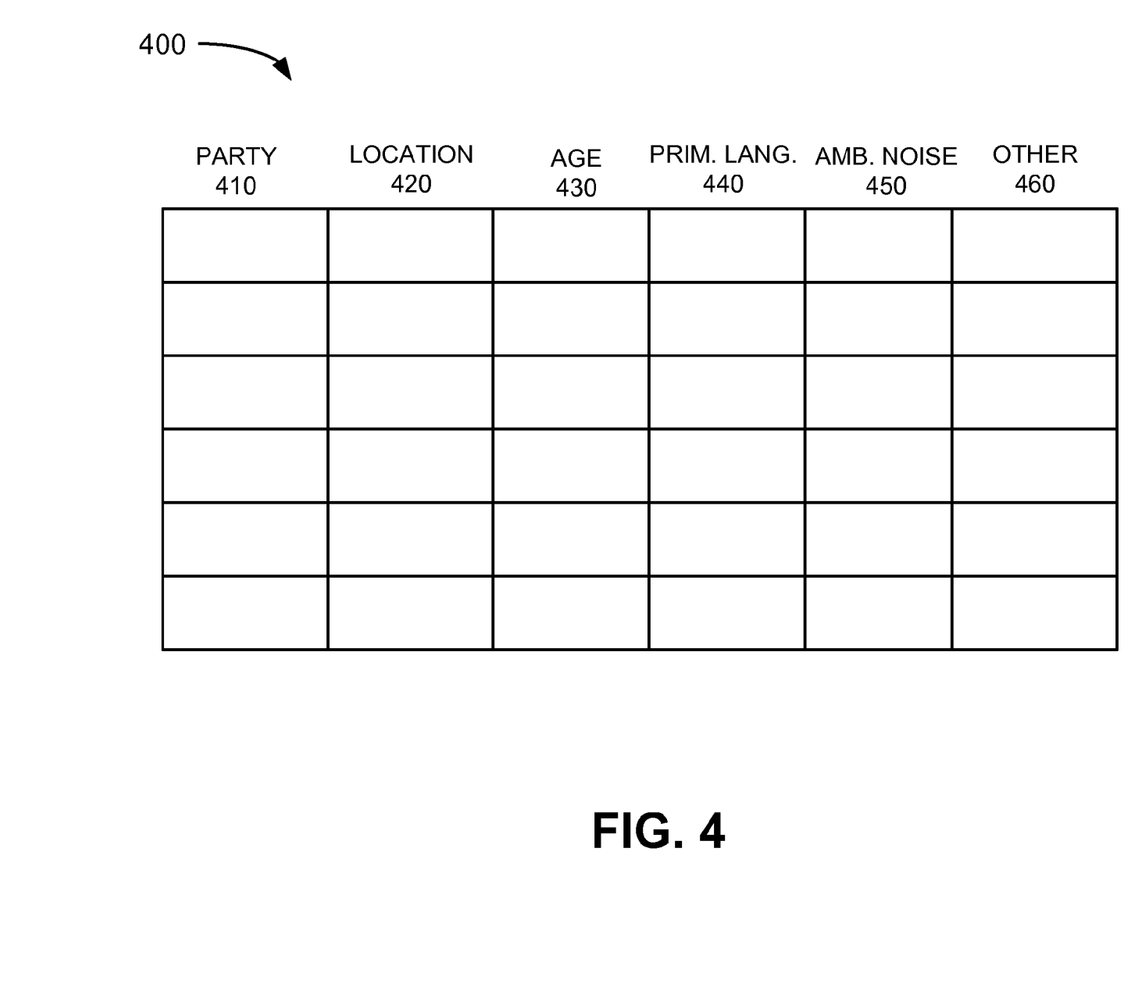
FIG. 4 illustrates an exemplary structure of a database stored in one of the devices of FIG. 1.

FIG. 4 is an exemplary database 400, for storing information associated with one or more parties included in an audience for particular audible communications or conversations, which may be stored in information database 330, for example. Database 400 may include a number of fields, such as, a party field 400, a location field 420, an age field 430, a primary language field 440, an ambient noise level field 450, and other field 460. Party field 410 may include information (e.g., an identifier, a name, an alias, a group/organization name, etc.) for identifying one or more parties, for example, associated with an audible communication (e.g., audience member).

Location field 420 may include information (e.g., coordinates, a place name, a region, etc.) for identifying a current location associated with the identified one or more parties. Age field 430 may include information (e.g., an approximate age, an age category, an average age, etc.) associated with the identified one or more parties. Primary language field 440 may include information identifying a primary language, if other than the language used for the audible communication, for example, associated with the identified one or more parties.

Ambient noise level field 450 may include information indicative of a noise level (e.g., in decibels (dB)) in a listening environment in which the identified one or more parties are located. Based on information from ambient noise level field 450, the target speech volume level may be adjusted. For example, the target speech volume level may be increased as the ambient noise level increases, to thereby indicate to the speaker that he/she should talk louder, as discussed in more detail below. Other field 460 may include information that may be used in assessing audio quality, such as whether the audible communication is amplified (e.g., via a speaker system), whether the identified one or more parties have a volume control for adjusting the volume of the audible communication. Other field 460 may include information another audience demographic, such as education level. Other field 460 may include subjective information that may be used in assessing audio quality, such as a degree of complexity of the subject matter associated with the audible communications.

Information may be entered into and/or stored in any one of the above fields upon initiation of an audible communication and/or dynamically at any point during the audible communication. In one implementation, assessment logic 320 may monitor information database 330 to determine, or be automatically notified by information database 330, that an entry in database 400 has been added or modified. Assessment logic 320 may use the added and/or updated information to re-perform any of the operations described below. In one implementation, the added and/or updated information may correspond to a change that exceeds a particular threshold value, which will indicate to assessment logic 320 to re-perform one or more of the operations described below.

Figure 5:
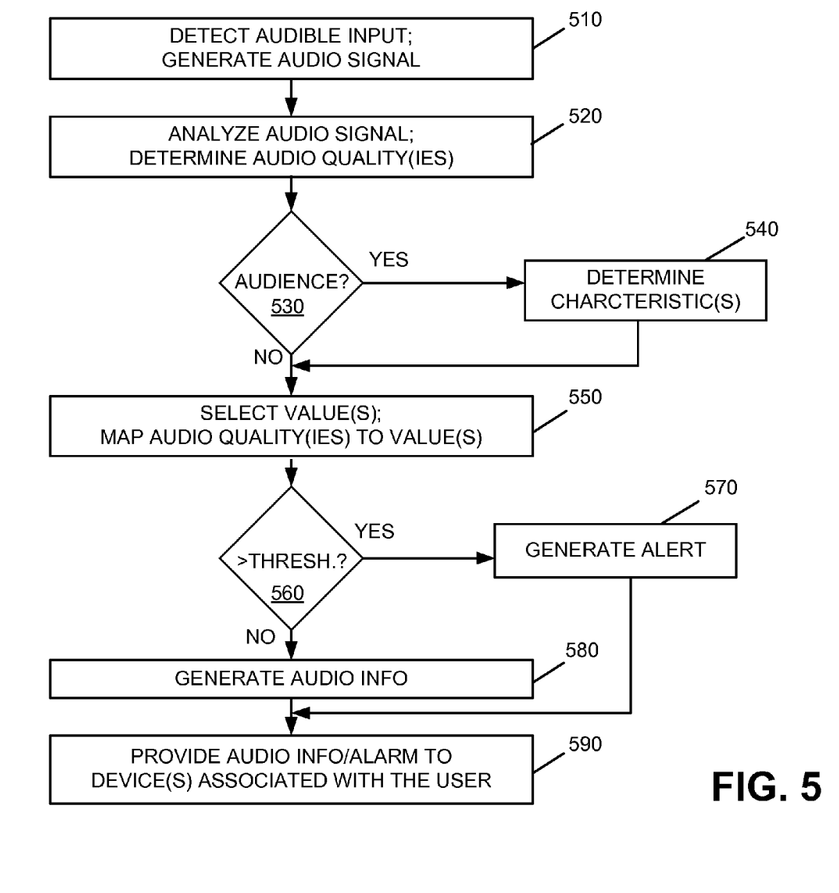
FIG. 5 is a flow diagram illustrating exemplary processing by various devices illustrated in FIG. 1.

FIG. 5 is a flow diagram illustrating exemplary processing associated with providing an audio assessment of audible communications from a user, in environment 100. Processing may begin with user device 110 detecting audible communications uttered into a microphone of user device 110, and audio assessment program 300 generating an audio signal corresponding to the audible communications (act 510). In one example, speech recognition logic 310 may convert voice data identified in the audio signal into corresponding text.

Assessment logic 320 may analyze the audio signal to determine select audio qualities (e.g., sound properties and/or linguistic properties) (act 520). For example, as discussed above with respect to FIG. 3, assessment logic 320 may determine a speaking rate associated with the voice data, for example, by analyzing the text with respect to time. In some instances, speaking rate may be determined by analyzing the audio signals directly. Assessment logic 320 may determine whether an audience is associated with the audible communications, for example, based on user input or other information obtained by assessment logic 320 (act 530). When it is determined that no audience is associated with the audible communication (act 530—NO), assessment logic 320 may select one or more values or range of values for comparing to the audio qualities, and mapping/output control logic 350 mapping the audio qualities to the selected values (act 550). In this case, the selected values may be preset or default values, for example, unrelated to a particular audience.

When it is determined that an audience is associated with the audible communication (act 530—YES), assessment logic 320 may determine one or more characteristics associated with one or more audience member (act 540). For example, assessment logic 320 may access information from database 400, and/or other information obtained by assessment logic 320 to identify one or more characteristics for individual members of the audience and/or determine a representative characteristic(s) for a group of audience members. Assessment logic 320 may use at least some of the one or more characteristics to set one or more values or range of values for comparing to the audio qualities, and mapping/output control logic 350 may map the audio qualities to the set values (act 550).

Based on results of the mapping received from mapping/output control logic 350, assessment logic 320 may determine whether a threshold value(s) applies for one or more of the audio qualities; and in cases where a threshold value(s) applies to a particular audio quality, assessment logic 320 may determine whether the applicable threshold value is exceeded (act 560). When it is determined that an applicable threshold value (e.g., 180 wpm) for a particular audio quality (e.g., speaking rate) has been exceeded (e.g., speaking rate is 200 wpm), assessment logic 320 may generate an alert indicative of the status (e.g., 200 wpm) of the particular audio quality (e.g., speaking rate) with respect to the applicable threshold value (e.g., 180 wpm), for example, for output via output device 250 (act 570). An alert may be sent, for example, to user device 110 (and/or user device 130, which may be coupled to user device 110, such as a Bluetooth® accessory) to notify the user that a particular audio quality (e.g., speaking rate) is currently (e.g., 200 wpm) outside the selected range of values (e.g., 180 wpm) (act 590).

When it is determined that no threshold value has been set, or that no threshold is exceeded, with respect to the one or more audio qualities, mapping/output control logic 350 may generate audio-related information based on results of the mapping operation performed by mapping/output control logic 350 (act 580). For example, with respect to speaking rate, the audio-related information may be a graph representative of the speaking rate (see, for example, FIG. 6), and/or a numeral representation of words per minute (wpm). The audio-related information may be provided in a variety of formats, may be in a number of different formats for a particular audio quality, and/or be in different formats for different audio qualities. The audio-related information to indicate a timeline representative of a chronological order of the voice data In addition to or as an alternative to graphic information, for example, the speaking rate may be indicated by audible "beeps" sent to a Bluetooth®-enabled earpiece of the user, in which a beep rate corresponds to the detected speaking rate. The audio-related information may be sent, for example, to user device 110 (and/or user device 130) for active or passive presentation to the user, for example, in a manner and under circumstances specified by the user (act 590). In this manner, a communicator may be provided with feedback concerning one or more objective criteria related to the communicator's speech.

Figure 6:
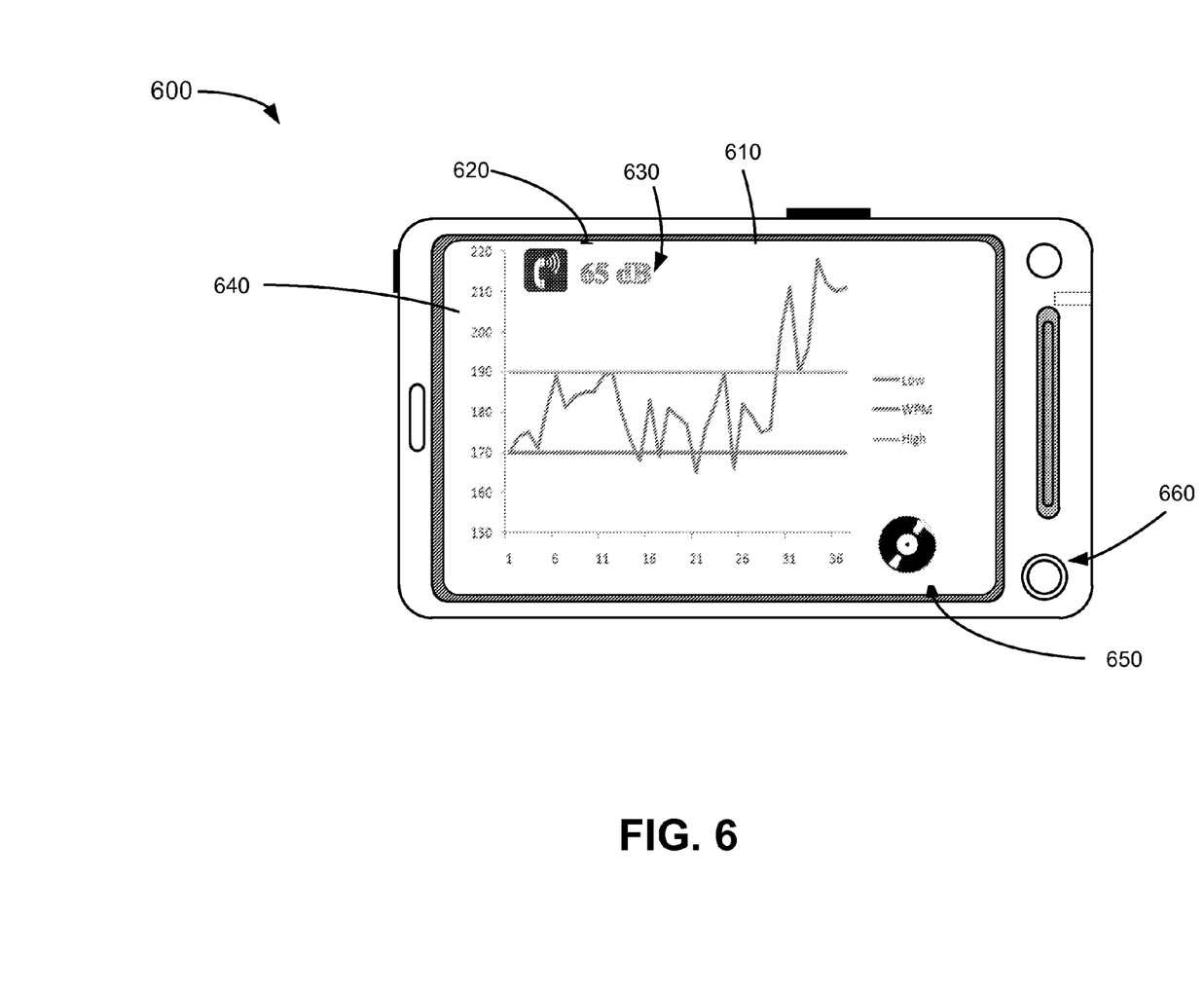
FIGS. 6-8 are exemplary outputs associated with exemplary applications of the processing of FIG. 5.

In an exemplary implementation, a user may be operating mobile terminal 600 in a presentation mode, for example, in which audio-related information associated with audible input, received via a microphone (not shown) of mobile terminal 600, which may correspond to user device 110 (and/or user device 130), is presented to the user via a display 610. For example, the user may be using mobile terminal 600 in a telecommunication session via a network with another communication device (e.g., user device 120). In another example, the user may be speaking directly to one or more parties, in which case mobile terminal 600 may not be being used for communicating, but may be activated to receive audible input from user. In this case, the user may have entered at least some of the information in information database 400 with respect to one or more individuals in the "live" audience.

In this example, the user may have selected to display audio-related information related to speaking rate, speaking volume, and a recording function. An exemplary icon 620 may be displayed indicative of the (e.g., current, avg., etc.) volume of the audible input. A size, color, flash, or other visual indicator may be used to correspond to a quantitative volume level. A numeric graphic representation 630 may be displayed to indicate the quantitative volume level (e.g., in decibels). Other representations may be used, for example, qualitative levels (e.g., high, low, medium, etc.). Graphic effects may be used on exemplary icon 620 and/or numeric graphic representation 630 to indicate an alert that has been generated as discussed above at act 570. Other types of alerts, such as audio (e.g., beep) and/or tactile (e.g., vibration) may be used.

In one embodiment, and LED 660 may be used to present the alert, corresponding to a particular color, by pulsing, etc. In one embodiment the alert is presented via different means (e.g., LED 660) than the means (e.g., display 610) used to present the audio-related information. In one embodiment, the alert is presented via a different device (e.g., user device 130, such as a Bluetooth® accessory) than the device (e.g., user device 110) used to present the audio-related information.

The alert may be set based on one or more characteristics associated with the audience, as discussed above, as determined from one or more of fields 410-460 in database 400. For example, mobile terminal 600 may have been used to receive a call from a particular telephone number, which may be stored as an entry in party field 410. Using caller ID, assessment logic 320 may determine a location for the caller and enter the information in location field 420.

In one implementation, the particular telephone number may be determined to be in an address book or contacts list stored, for example, in another application of mobile device 400. In this case, particular information retrieved from the address book/contacts list may be used to store specific information in entries in one or more of fields 410-460. Primary language field 440 may indicate that the caller is a non-native English speaker. This characteristic of the caller (i.e., audience), may be used by mapping/output control logic 350, as described above, to map speaking rate, for example, to a particular set of values. That is, the range of the target speaking rate may be adjusted downward (e.g., 20% or more/less) to reflect that the caller is a non-native English speaker, when the audible communications are in English, for example.

When a communication session involves multiple parties (e.g., three-way calling), database 400 may include entries corresponding to the different parties. In this case, the set of values may be selectively applied to a particular one of the parties. For example, user input may be used to determine which of the parties is being spoken to at any given time in the communication session. For example, the user may press a button on a keypad (not shown) on user device 110 to indicate that remarks are being directed to a particular one of the parties. In another example, assessment logic 320 (or other component) may determine that the user has prefaced specific remarks by addressing a particular one of the parties (e.g., by name). In this case, the audio-related information provided to the user may be customized to a particular party.

Also in this example, the speaking rate (in wpm or other units) may be displayed on a graph 640 as a function of time, with respect to the audible communications. Visual indications may be used to correspond to target range of speaking rates. Here it is shown as a low of 170 wpm and a high of 190 wpm. As discussed above, the target range may be preset, audience-specific, and/or a default range. Again, different visual and/or graphic effects may be used to vary the audio-related information presented in graph 640 to correspond to different action-levels and/or alerts, and/or as a function of time. In this example, when the speaker exceeds the target rate, the communicator can visually see that the target rate is exceeded and accordingly adjust (e.g., slow down) the communicator's speech to return to a speaking rate that is within the target range.

A record icon 650 may be presented via display 610 to indicate that mobile device 600 is recording audio input, playing recorded audio files, etc. Other symbols (e.g., icons) may be used.

Figure 7:
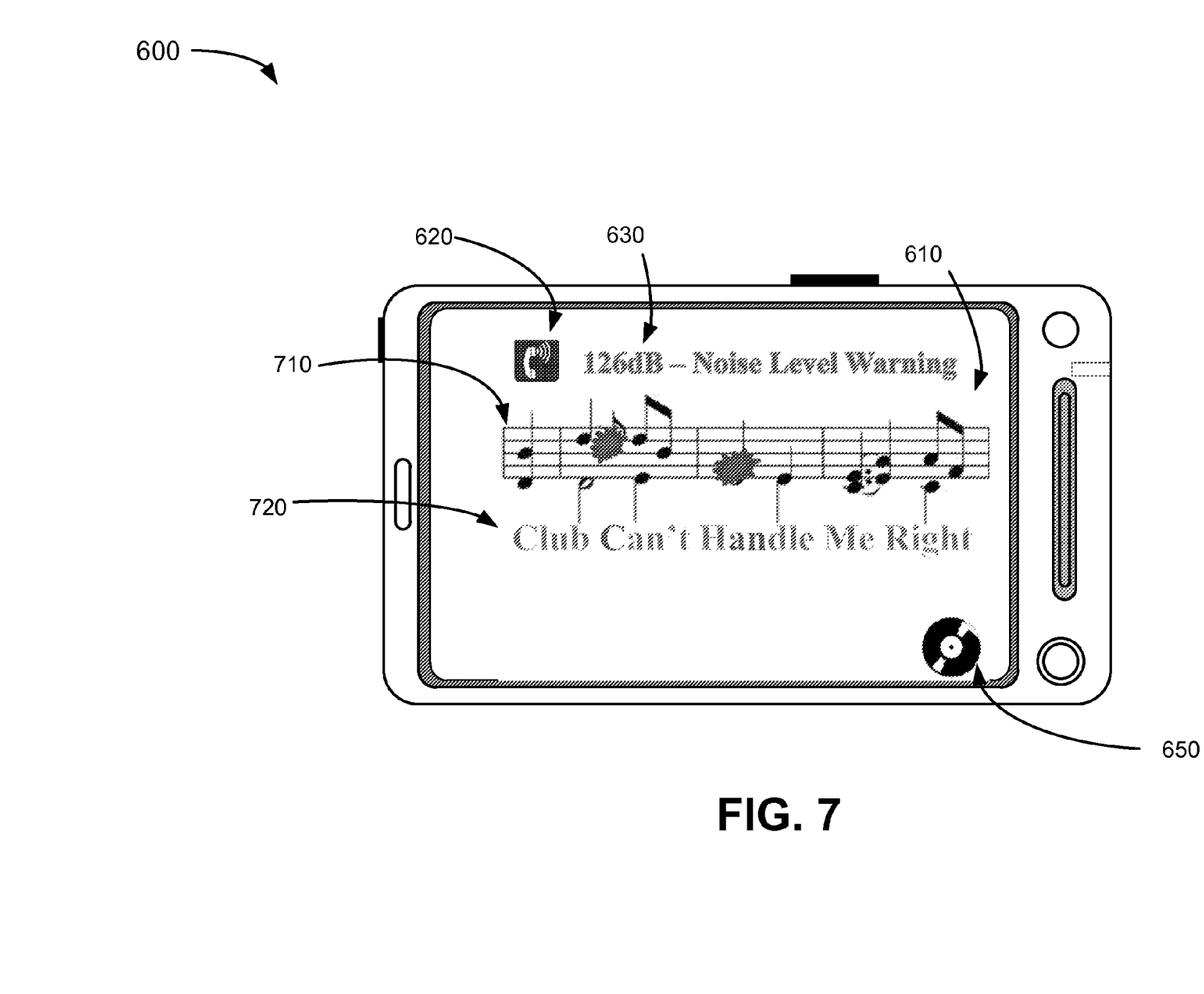

As another example, illustrated in FIG. 7, a user may be operating mobile terminal 600 in an "entertainment/instructional mode," for example, in which audio qualities (and thus audio-related information) may not be audience-based. That is, mapping/output control logic 350 may map one or more audio qualities associated with audible input to a set of values determined without regard to audience-specific information. For example, the set of values may correspond to objective criteria such as musical notes, lyrics, etc., associated with music, and/or linguistics, vocabulary, etc. associated with a particular language.

In this example, display 610 may present the audio-related information as music information 710 and/or lyrics 720 in a karaoke-type function. As another example, display 610 may present the audio-related information as feedback with respect to foreign language instruction. Audio-related information provided by assessment logic 320 with respect to singing input may be represented in one or more of exemplary icon 620, numeric graphic representation 630, record icon 650, music information 710, and/or lyrics 720. Again, any number of visual effects may be used to vary the graphic indicators.

For example, numeric graphic representation 630 may indicate that the detected volume of the user's singing is exceeding a target volume level. Music information 710 may indicate the detected notes that are "hit" and the detected notes that are "missed." That is, the audio-related information may relate to an evaluation (e.g., scoring) of the user's singing performance. In one implementation, the audio-related information may relate to an evaluation of linguistic accuracy of the user's recitation of terms of a particular language.

Figure 8:
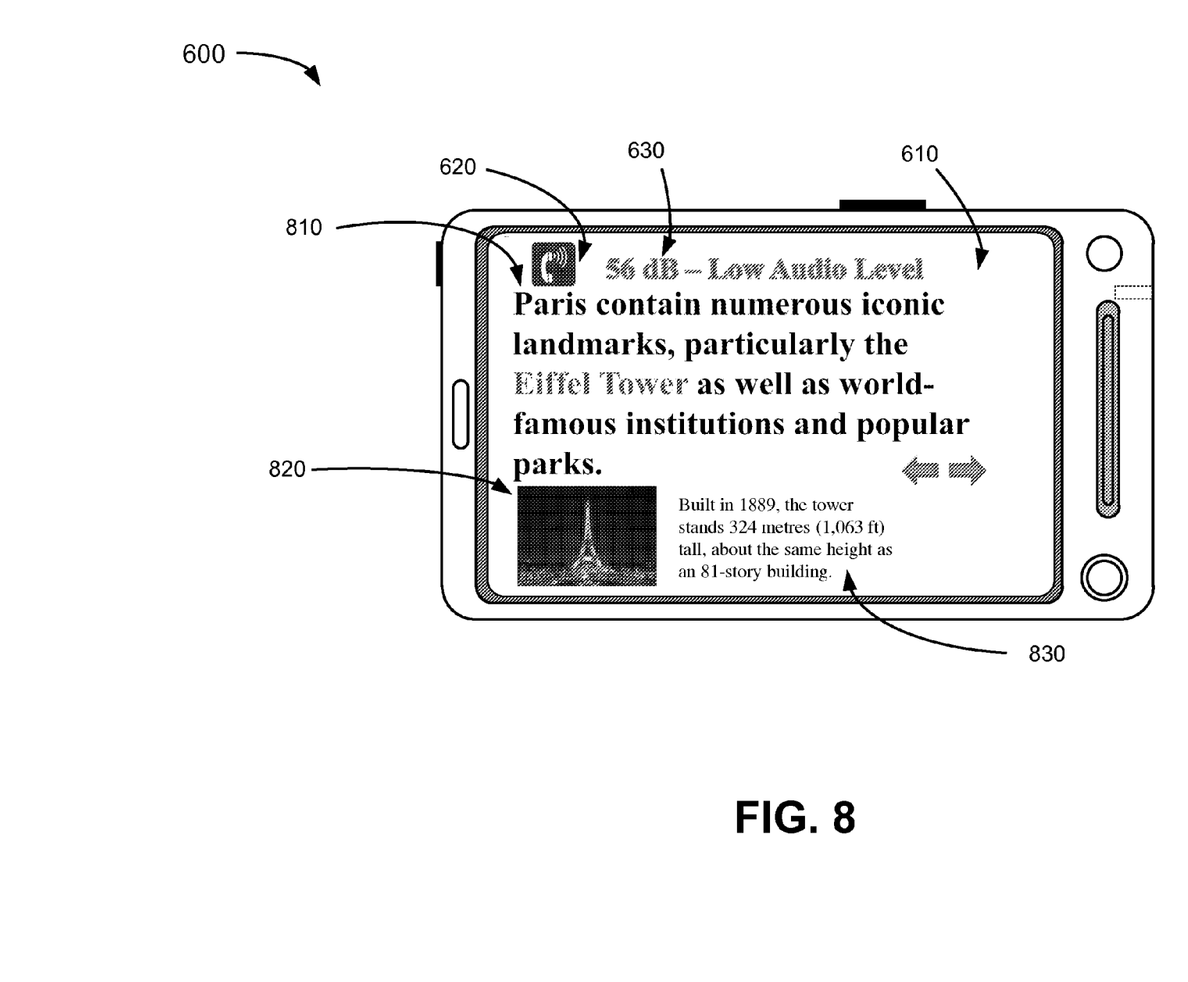

As still another example, illustrated in FIG. 8, a user may be operating mobile terminal 600 in a "teleprompter mode," for example, in which audio qualities (and thus audio-related information) may be or may not be audience-based. That is, mapping/output control logic 350 may or may not map one or more audio qualities associated with audible input to a set of values determined with regard to audience-specific information. In this example, display 610 may present the audio-related information as scripted text 810, an illustration 820, and/or a notation 830 in a teleprompter-type function.

In this example, assessment logic 320 may provide audio-related information related to the user's recitation of scripted text 810, which audio-related information may be represented in one or more of exemplary icon 620, numeric graphic representation 630, scripted text 810, illustration 820, and/or notation 830. Again, any number of visual effects may be used to vary the graphic indicators. For example, text information 810 and/or notation 830 may include hyperlink designations to a referent. Scripted text 810 may be representative of a portion of a particular presentation stored on user device 110, for example.

In one example, mapped values may correspond to specific words in scripted text 810 that, when read by the user (i.e., detected by user device 110), may trigger assessment logic 320 to provide corresponding notation 830. In one implementation, assessment logic 320 may dynamically search the Internet, for example, using search terms corresponding to words detected in the user's speech, and download notation 830 as the user reads scripted text 810. Scripted text 810 may be searchable based on, for example, words that are detected from the user's speech. In one implementation, assessment logic 320 may dynamically and/or automatically scroll through scripted text 810 based on the user's detected speech and/or a detected pace of the user's speech.

Implementations described herein provide for assessing audio qualities of audible input. The assessed qualities may be used to generate audio-related information for feedback to a presenter as an aid during communications (e.g., a presentation delivered to an audience, a conversation with one or more parties, a music performance, foreign language instruction, call center training, etc.). This may also allow the communicator to make adjustments to various aspects of the communicator's delivery. In addition, various portions of the audio-related information may be provided to other applications of a user device to perform various other functions (e.g., adjust audio signal amplification, etc.).

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to generating audio-related information from voice data and presenting the audio-related information to a party substantially instantaneously (e.g., in real time). In other implementations, other types of input may be received and analyzed during communications/a performance (e.g., sound from playing of a musical instrument). In this case, the feedback may be used for musical instrument instruction.

In addition, features have been described above as involving "live" feedback. In other implementations, recorded files of the audible input may be used to present the audio-related information to the user following completion of the communications. Audio assessment program 300 may store the files for later display and/or retrieval. In some instances, a feedback history may be analyzed to provide the user with an overall assessment of the user's particular audible communications over a period of time.

Further, in some implementations, audio assessment program 300 may alert the parties involved in a conversation that portions of the conversation are being stored for later recall. For example, an audio or text alert may be provided to the parties of the conversation prior to audio assessment program 300 identifying and storing portions of the conversation.

In addition, while series of acts have been described with respect to FIG. 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a communication interface configured to generate audio signals from audible communications, received from a user, for communication to at least one party located at a current location;
   an output device; and
   logic configured to:
   determine multiple audio qualities, using the audio signals, including a rate of speech associated with the audible communications,
   determine a target value range for each of the audio qualities based on a demographic corresponding to the current location of the at least one party when determining the target value range for the rate of speech, compare at least one of the audio qualities to the associated target value ranges, to generate at least:
   a first type of audio-related information responsive to determining that one or more of the audio qualities correspond to a first associated target value range, and a second type of audio-related information, responsive to determining that one or more of the audio qualities do not correspond to a second associated target value range, wherein the first type of audio-related information or the second type of audio information indicates the rate of speech associated with the audible communications, and provide, via the output device during the audible communications, at least one of the first type of audio-related information or the second type of audio-related information to the user, wherein the provided first or second type of audio-related information includes visual information and audible information.

2. The device of claim 1, wherein the logic is further configured to:
determine a first language associated with the audible communications,
obtain a second language with respect to the at least one party, and
determine at least one of the target value ranges further based on the first and second languages.

3. The device of claim 1, wherein the logic is further configured to:
obtain age information with respect to the at least one party,
determine at least one of the target value ranges further based on an age demographic corresponding to the age information, and
generate the first type of audio-related information or the second type of audio-related information to indicate a volume level associated with the audible communications.

4. The device of claim 1, wherein when the audible communications relate to performing a song, the logic is further configured to:
determine at least one of the target value ranges further based on notes of the song, and
generate the first type of audio-related information or the second type of audio-related information to indicate an assessed performance score with respect to the performing of the song.

5. The device of claim 1, wherein when the audible communications relate to terms of a particular language, the logic is further configured to:
determine at least one of the target value ranges further based on linguistic criteria for the particular language, and
generate the first type of audio-related information or the second type of audio-related information to indicate an assessed linguistic accuracy associated with the terms.

6. The device of claim 1, further comprising:
a display to display scripted text related to the audible communications, wherein the logic is further configured to:
determine at least one of the target value ranges further based on the scripted text, and
generate the first type of audio-related information to indicate notations corresponding to the scripted text.

7. The device of claim 1, wherein the logic is further configured to:
generate the first type of audio-related information to indicate a timeline representative of a chronological order of the audible communications.

8. The device of claim 1, wherein the output device is configured to transmit, via a wireless protocol, the first type of audio-related information or the second type of audio-related information to a user device associated with the user, wherein the transmitted first or second type of audio-related information further comprises:
tactile information.

9. The device of claim 1, wherein the logic is further configured to:
convert the audible communications to text using language recognition, and
analyze the text to determine one or more of the multiple audio qualities.

10. The device of claim 1, wherein the second associated target value range comprises a set of values bounded by a maximum threshold and a minimum threshold, and the logic is further configured to:
generate the second type of audio-related information to indicate that the maximum threshold has been exceeded or the minimum threshold has not been exceeded.

11. The device of claim 1, wherein the device comprises a mobile phone including:
a microphone configured to receive voice data, used to generate the audio signals, during a communication session with a communication device, associated with the at least one party, via a network, and
a transceiver to transmit the audio signals to the communication device.

12. The device of claim 1, wherein the device comprises a mobile phone comprising:
a plurality of output devices configured to present the first and second types of audio-related information.

13. The device of claim 1, further comprising:
a global positioning system (GPS) device configured to obtain location information associated with the device during the audible communications, wherein the logic is further configured to determine at least one of the target value ranges further based on the location information.

14. A computer-executed method comprising:
receiving audible communications associated with a communication session associated with at least one party located at a current location;
converting the audible communications to text;
analyzing the text to determine multiple linguistic qualities, including at least a rate of speech associated with the audible communications;
comparing a first one of the multiple linguistic qualities to a first range of values set for generating results identifying whether the first one of the multiple linguistic qualities are within the first range;
comparing a second one of the multiple linguistic qualities to a second range of values set for generating results identifying whether the second one of the multiple linguistic qualities are outside the second range, wherein at least one of the first range and the second range is for the rate of speech, and the corresponding values are set based on a demographic corresponding to the current location of the at least one party; and
outputting information indicative of the generated results of the comparing, wherein the outputted information includes at least two of:
visual information,
audible information, and
tactile information.

15. The computer-executed method of claim 14, wherein the method further comprises:
setting the first and second ranges of values based on other information obtained with respect to the at least one party.

16. The computer-executed method of claim 14, further comprising:
  presenting the outputted information, during the communication session, to a party vocalizing the audible communications.

17. A non-transitory computer-readable medium having stored thereon sequences of instructions which, when executed by at least one processor, cause the at least one processor to:
  determine multiple qualities, associated with an utterance of terms by a user of a user device, including at least a rate of speech associated with the utterance;
  obtain a current location of an audience associated with the uttered terms;
  generate a first type of feedback information based on one or more of the multiple qualities determined to be within a first target range of values;
  generate a second type of feedback information based on one or more of the multiple qualities determined to be outside of a second target range of values, wherein the second target range of values is for the rate of speech, and the corresponding values are set based on a demographic corresponding to the current location of the audience; and
  provide the first and second type of feedback information to the user via an output device of the user device, wherein the provided first or second type of feedback information includes at least two of:
    visual information,
    audible information, and
    tactile information.

18. The non-transitory computer-readable medium of claim 17, further including instructions for causing the at least one processor to:
  determine an ambient noise level associated with the user device, and
  generate at least one of the first type of feedback information or the second type of feedback information based on the ambient noise level.

19. The non-transitory computer-readable medium of claim 17, further including instructions for causing the at least one processor to:
  obtain other information regarding the audience associated with the uttered terms, and
  generate the first type of feedback information or the second type of feedback information based on at least some of the other information.

20. The device of claim 1, wherein the logic is further configured to determine whether the user and the at least one party share a common native language, the logic being further configured to:
  determine target value ranges that differ for the rate of speech when the user and the at least one party share a common native language relative to when the user and the at least one party do not share a common native language.

21. The computer-executed method of claim 14, wherein the first or second range of values is set based on whether a language associated with the audible communications is native to a party associated with the communication session.

22. The non-transitory computer-readable medium of claim 17, wherein the instructions are configured to further cause the at least one processor to:
  set the target range of values based on whether a language associated with the uttered terms is a native language of the audience of the utterance.

* * * * *